Figure 1:
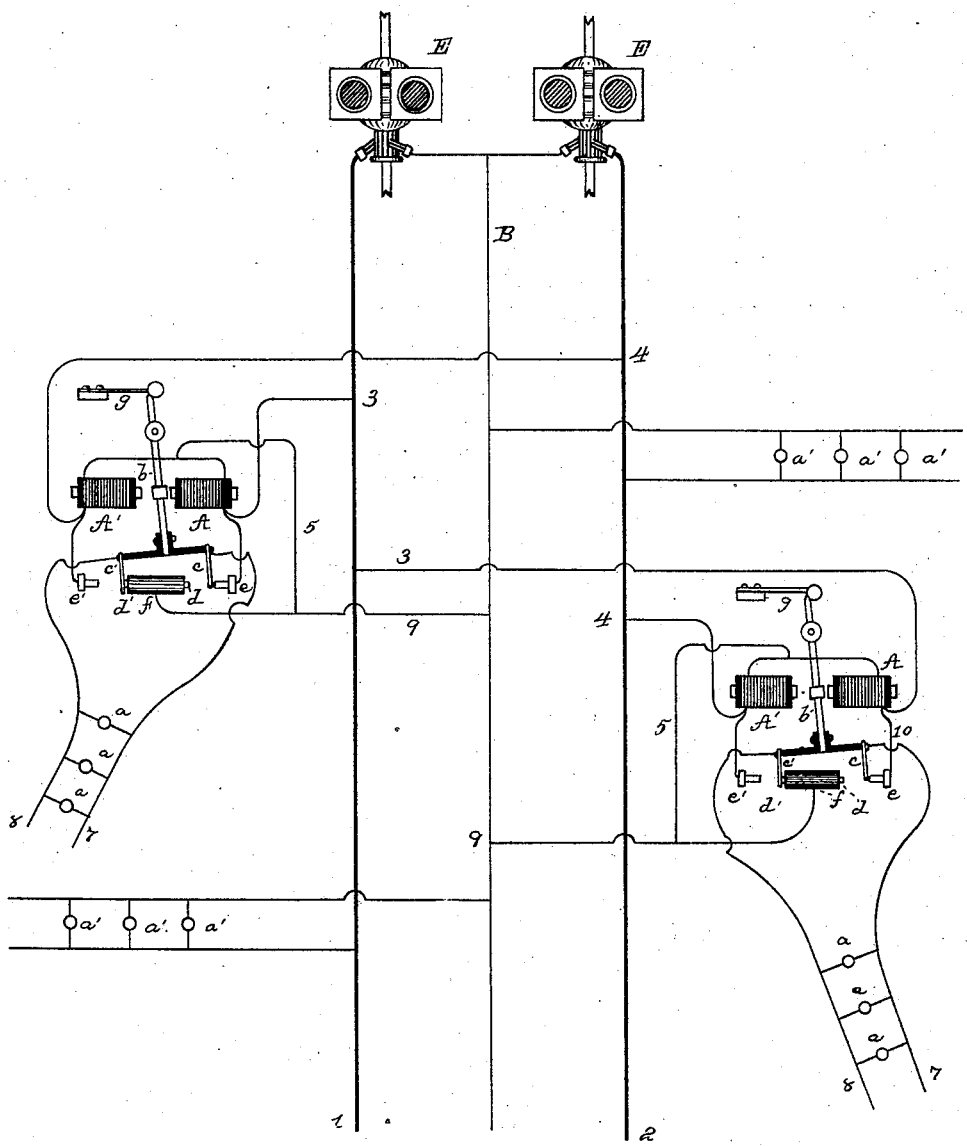

(No Model.)  3 Sheets—Sheet 1.

T. A. EDISON.
SYSTEM OF ELECTRICAL DISTRIBUTION.

No. 283,983.  Patented Aug. 28, 1883.

ATTEST:
E. C. Rowland
N. W. Seely

INVENTOR:
Thomas A. Edison
By Rich¹ N. Dyer,
Atty (No Model.)

3 Sheets—Sheet 2.

T. A. EDISON.
SYSTEM OF ELECTRICAL DISTRIBUTION.

No. 283,983. Patented Aug. 28, 1883.

ATTEST:
E. E. Rowland
H. W. Seely

INVENTOR:
Thomas A. Edison
By Rich'd N. Dyer
Atty (No Model.)   3 Sheets—Sheet 3.

T. A. EDISON.
SYSTEM OF ELECTRICAL DISTRIBUTION.

No. 283,983.   Patented Aug. 28, 1883.

ATTEST:
E. C. Rowland
H. W. Seely

INVENTOR:
Thomas A. Edison
By Rich'd N. Dyer,
Atty.

UNITED STATES PATENT OFFICE.

THOMAS A. EDISON, OF MENLO PARK, NEW JERSEY.

SYSTEM OF ELECTRICAL DISTRIBUTION.

SPECIFICATION forming part of Letters Patent No. 283,983, dated August 28, 1883.

Application filed April 17, 1883. (No model.)

*To all whom it may concern:*

Be it known that I, THOMAS A. EDISON, of Menlo Park, in the county of Middlesex and State of New Jersey, have invented a new and useful Improvement in Systems of Electrical Distribution, (Case No. 557,) of which the following is a specification.

This invention relates, mainly, to compensating systems of electrical distribution such as are described in my Patent No. 274,290, in which a divided source of electrical energy is employed to supply electric lamps or other translating devices arranged in multiple series, and a compensating conductor or conductors extend from between the translating devices to the point or points of division of the source of energy to preserve the balance of the system. The invention is also applicable, however, to those systems in which a main conductor is divided into series of branches, such branches containing the translating devices.

The object of the invention is to preserve, by devices either operating automatically or controlled from the central station or source of supply, the equality of the number of translating devices in the different parts or branches of systems of the character described. To accomplish this automatically I provide means controlled by variations in current, which, when the number of translating devices in one part of the system is too great, so that the current declines in such part, operate circuit-controlling devices, which shift a portion of the translating device from that part of the system to another, whereby the balance is maintained.

To control the devices from the central station, which may be preferable to the automatic operation, I may place each set in connection with a circuit running back to said station, so that by opening and closing such circuit the devices may be put in condition to be operated according to the preponderance of current in either part of the system; or I may place all the electric controlling devices which operate in the same direction and are arranged to be affected by different amounts of current in the same circuit, and vary the current in such circuit so as to throw into operation more or less of such controlling devices and shift a greater or less number of translating devices from one part of the system to another.

In the accompanying drawings is shown the application of my invention to a compensating system.

Figure 2:
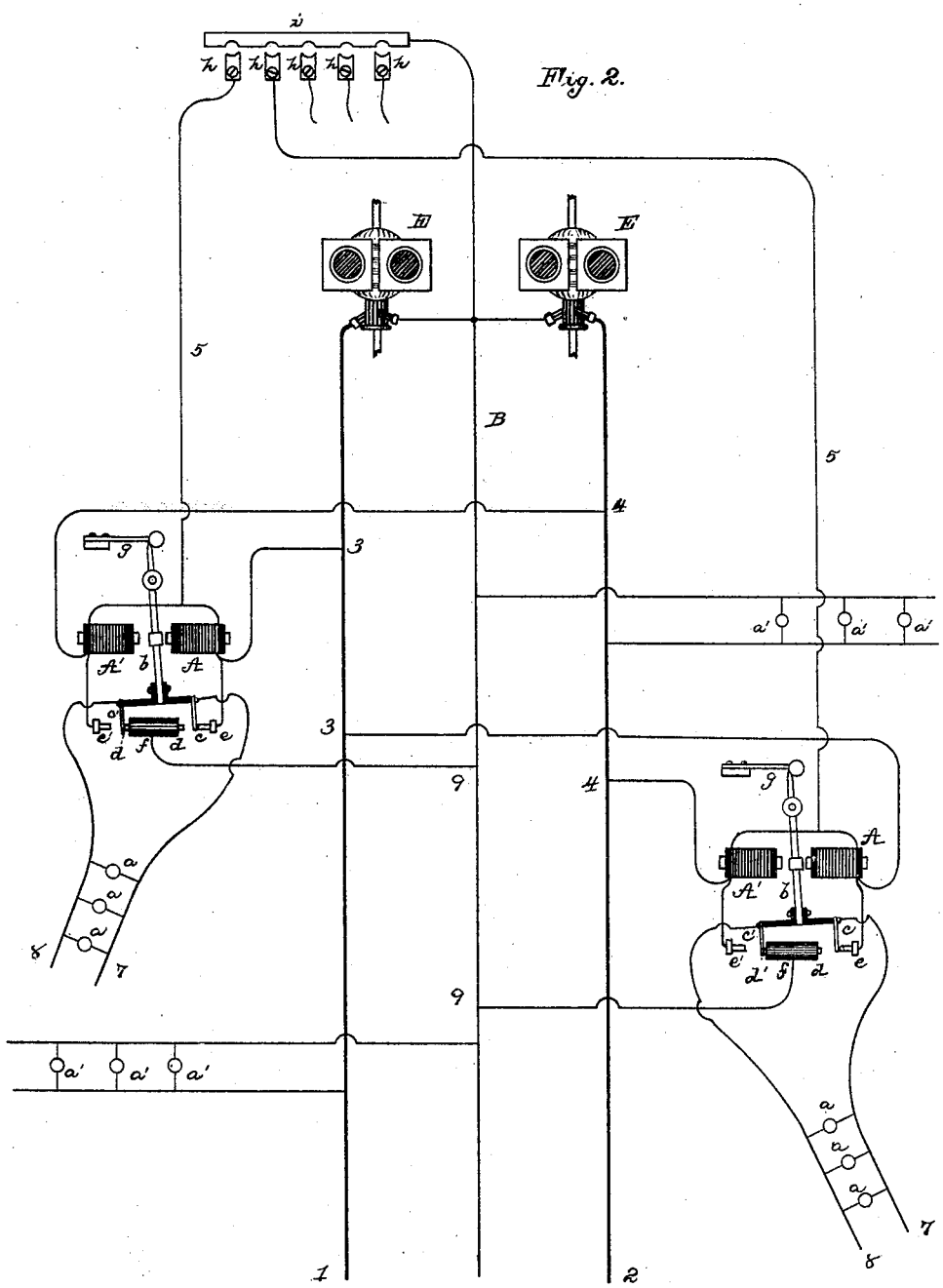
Figure 3:
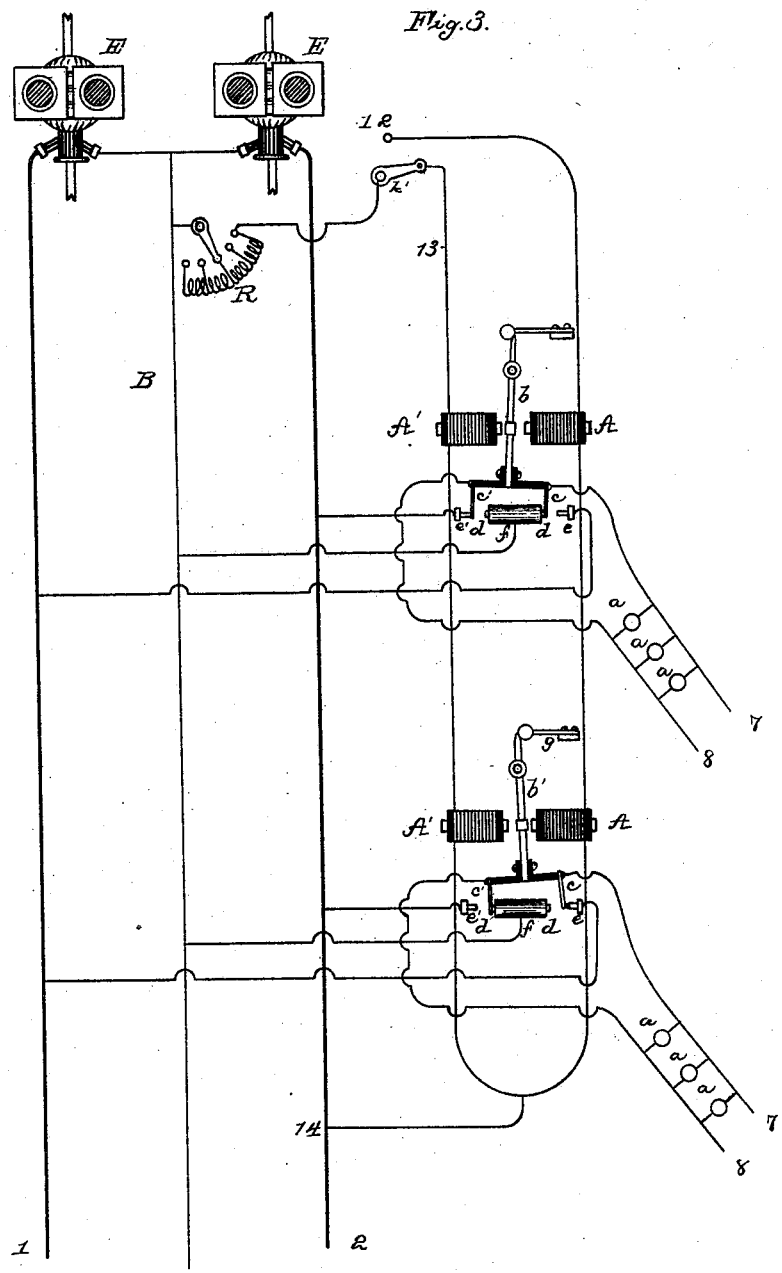

Figure 1 is a diagram illustrating the preferred automatic arrangement; Fig. 2, one showing the mode of controlling the devices from the central station, and Fig. 3 illustrates the mode of both controlling and operating the devices from the central station.

E E are dynamo-electric machines placed in series and forming the divided source of energy, the compensating-conductor B extending from the point of division. 1 2 are the main conductors. The circuits containing lamps or other translating devices, $a$, are arranged to be thrown from one side of the system to the other. The lamps $a'$ are connected in permanent multiple-arc circuits, each connected to a main conductor and the compensating-conductor.

Referring to Fig. 1, A A' are electro-magnets. Each magnet A is connected by conductor 3 and conductors 5 and 9 between the main conductor 1 and the compensating-conductor B. Each magnet A' is similarly connected between main conductor 2 and conductor B by conductors 4, 5, and 9. Thus the magnet A is affected where there is an excess of current in main conductor 1, and magnet A' when such excess occurs in conductor 2, by reason of the decrease in the number of translating devices on either side.

Between the magnets A A' is the pivoted armature-lever $b$, which carries the two-armed circuit-controller $c$ $c'$.

To the arm $c$ is connected the conductor 7, and to arm $c'$ the conductor 8, which form a circuit, across which the translating devices $a$ $a$ are arranged in multiple arc. Arm $c$ plays between contact $d$ and contact $e$, the latter of which is connected with main conductor through wire 3. Arm $c'$ is placed between contacts $a'$ and $e'$, the latter being connected to conductor 2 through wire 4. Both contacts $d$ $d'$ are connected to compensating-conductor B by conductor 9, $f$ being a metallic cylinder.

When the current in main conductor 1 is in excess of that in main conductor 2, it is desirable to shift a portion of the translating devices from the latter to the former. The magnet A is energized by the excess of current and draws the armature $b$ toward it, the ball and spring $g$ assisting to throw the armature over, the arm $c$ making contact with $e$, and the arm $c'$ with $d'$, as shown. A circuit is thus formed, including the lamps $a$, from conductor 1 to conductor B via 3, 10, 7, 8, $f$, and 9.

When the current becomes stronger in conductor 2, the magnet A' is more greatly energized and draws the armature $b$ toward it, closing circuit at $c'$ and $d$, and thus placing the lamps $a$ between the conductors 2 and B.

It is evident that as many sets of magnets A A', with devices controlled thereby, may be provided, as desired. Each house or building in the district may be so provided, or only a few arranged to preserve the balance to a sufficient extent. The magnets would be arranged to operate with different amounts of current, so that successive changes would be made as desired.

It is evident, also, that the invention can be as readily applied if the system is divided into more than two parts by more than one compensating-conductor.

The arrangement illustrated in Fig. 2 is the same as that just described, except that the conductors 5 of each set, instead of being connected directly with the compensating-conductor, runs to the central station, where it is connected with a contact-plate, $h$. Circuit is completed by the insertion of plugs between the plates $h$ and plate $i$, which is connected by conductor 11 with the compensating-conductor.

Indicating circuits and devices are provided, as shown in my Patent 266,793, of October 31, 1882, to show the electrical condition at different parts of the system.

When it is desired to throw any set of translating devices into connection with the opposite side of the system, circuit is closed at $h\ i$ to the set of controlling-magnets A A', which it is desired to operate, and that magnet will be affected which is in connection with the side having the preponderance of current, the effect being the same as before explained. The electrical devices are thus controlled from the station, but operated automatically.

In Fig. 3 the two magnets A are placed in series in a circuit, 12 14, and the magnets A' are similarly arranged in a circuit, 13 14. The switch $k$ closes either of these circuits, as desired. The operation of the magnets upon the devices affected by them is similar to that described with reference to Fig. 1.

R is an adjustable resistance in the conductor which runs to the switch $k$. By adjusting this resistance the current in the circuit 12 14 or 13 14, as the case may be, is varied.

The magnets A are so arranged, either by difference of winding, difference in distance between magnet and armature, or otherwise, that a different amount of current is required to cause each magnet to attract its armature, and the magnets A' are similarly arranged with relation to each other. Hence by adjusting the resistance R to different extents more or less of the series of magnets which is in circuit at the time can be made to act and to throw the circuits controlled by them into connection with the opposite side of the system from before.

Suitable indicating devices are provided at the central station, as before explained.

As shown, the magnets A' are in circuit, but the current is insufficient to cause both to attract their armatures. By adjusting the resistance the other magnet may be caused to act, and the circuit controlled by it can be connected across the other side of the circuit. By this arrangement the devices are both controlled and operated from the central station.

It is evident that any desired number of magnets with their accompanying apparatus may be used.

It is evident that instead of using an adjustable resistance each magnet could be placed in a separate circuit, means being provided at the central station for closing the circuit of any magnet, as desired.

In applying this invention to a system in which feeding-conductors are used it is preferred to place near the extremity of each feeding-circuit, a number of the electrically-operated compensating arrangements indicating circuits being provided, as usual. When the indicators show too much or too little pressure at the terminals of any circuit, one or more of the magnets at that locality will be energized and caused to change the connection of the devices controlled by it.

In series systems wherein a main conductor is divded into two or more series of divisions or branches, each branch containing a translating device, and the source of energy not being divided, my invention may be applied to change the connection of a branch from one series to another. It is evident that this arrangement is the same as that in Fig. 1, except that the compensating-conductor B would not be connected between the generators, one generator being used alone, or two or more with ordinary series or multiple-arc connections.

In a compensating system, if the number of translating devices in the district becomes at any time so small that it can be supplied by one division of the source of energy, all such translating devices can be thrown onto one side of the district, the system becoming then an ordinary multiple-arc system, with the unnecessary generators out of use, and the compensating-conductor forming one of the main conductors of the system.

It is to be understood that all patentable features of novelty shown or described, but not claimed herein, are reserved for protection by other patents, and have been or will be included in other applications for patents.

What I claim is—

1. In a compensating system of electrical distribution, the combination, with a translating device or group thereof, of automatically operated means for changing the connections of such device or group from one part of the system to another, to maintain the balance of the system, substantially as set forth.

2. In a compensating system of electrical distribution, the combination, with a translating device or group thereof, of electrically-operated means for changing the connection of such device or group from one part of the system to another, substantially as set forth.

3. In a compensating system of electrical distribution, the combination, with a translating device or group thereof, of means controlled from the central station for changing the connection of such device or group from one part of the system to another, substantially as set forth.

4. In a compensating system of electrical distribution, the combination, with a translating device or group thereof, of means, controlled from the central station and operated automatically by the current in the system, for changing the connection of such device or group from one part of the system to another, substantially as set forth.

5. In a compensating system of electrical distribution, the combination, with a translating device or group thereof, of oppositely-acting electro-magnetic devices energized by the current in the system, and circuit-controlling mechanism controlled by said electro-magnetic devices for changing the connections of such translating device or group from one part of the system to another, substantially as set forth.

6. In a compensating system of electrical distribution, the combination, with a translating device or group thereof, of two electro-magnets, one connected with each part of the system, and circuit-controlling devices controlled by said electro-magnets, whereby when the current in one part is stronger than in another, the connections of such translating device or group are changed from the weaker side to the stronger, substantially as set forth.

This specification signed and witnessed this 5th day of April, 1883.

THOS. A. EDISON.

Witnesses:
   H. W. SEELY,
   EDWARD H. PYATT.